March 31, 1931. W. J. MacARTHUR 1,798,799
METALLIC PACKING THRUST WASHER
Filed Jan. 10, 1928

WILLIAM J. MacARTHUR
INVENTOR

Paul W. Frizzman.
ATTORNEY

Patented Mar. 31, 1931

1,798,799

UNITED STATES PATENT OFFICE

WILLIAM J. MacARTHUR, OF LOS ANGELES, CALIFORNIA

METALLIC-PACKING THRUST WASHER

Application filed January 10, 1928. Serial No. 245,644.

My invention relates to the art of packing piston rods, plungers and the like with especial reference to metallic packing applied to plunger type pumps and impeller shafts of centrifugal pumps.

An object of my invention is to provide means in such a thrust washer which will compensate for distortion of the gland due to straining by the gland-securing bolts, and maintain the joints between gland and packing rings suited to the conditions of operation.

A further object of my invention is to provide a thrust washer which will allow for lateral deflection of the shaft or plunger and still permit the use of simple square ended packing rings.

Figure 2:
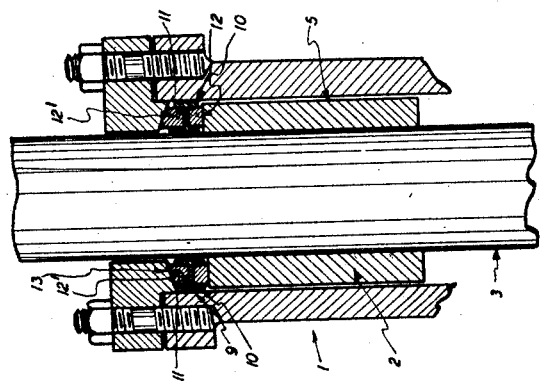
Figure 1:
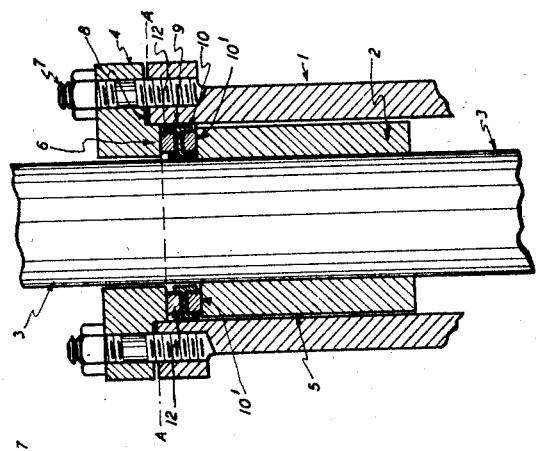

I obtain these objects by means of the mechanism illustrated in the accompanying drawing, in which Figure 1 is a sectional view through a conventional stuffing box equipped with metallic packing, showing the application of my improved thrust washer to a reciprocating pump shaft, and Figure 2 is a sectional view similar to Fig. 1, except that the modification here shown is intended for use on the impeller shaft of a centrifugal pump.

Figure 3:
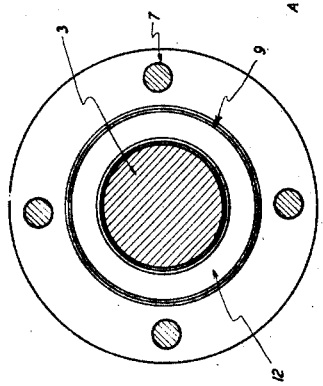

Figure 3 is a view on the line A—A of Figure 1.

Referring to Figure 1, numeral 1 indicates the stuffing box housing of a plunger type pump equipped with metallic packing, indicated by numeral 2, the plunger 3 passing therethrough, the sole purpose of the packing comprising a unitary cylindrical sleeve 2 being to prevent leakage along the surface of the plunger. A gland 4 surrounds the plunger, retaining the packing within the packing chamber 5 by means of the annular shoulder 6 projecting therein and closely fitting the bore of said chamber. The gland 4 is secured to the housing 1 by a plurality of bolts 7, leakage between gland and housing being prevented by the metal gasket 8, in this instance an annealed copper wire placed between gland and housing and compressed by tightening bolts 7. My improved thrust washer 9 is situated between the end 10' of the metallic packing 2 and the end of shoulder 6. This thrust washer is cylindrically bored 2 to 3 hundredths larger than the diameter of the plunger and turned 3 to 5 hundredths smaller than the bore of the packing chamber 5. This thrust washer is composed of a steel core 10 with an annular recess 11 turned in each side, this recess being radially wider at the bottom than at the top for the retention of the rings 12 which fill the recesses 11 and project about 1/8" beyond the confines of the steel core 10. The material of ring 12 is any suitable metal capable of plastic deformation under the action of the resilient means holding the packing rings axially against one another and against the shoulder 6, when either said shoulder or the end 10' of the metallic packing fails to contact fully with ring 12. In this way the slight deformation of the gland 4 which is practically impossible to overcome when it is tightened sufficiently to prevent leakage between it and the housing 1 is compensated by the metal of rings 12 flowing until continuous contact is established between such rings and the faces against which they work. For pipe line pumps handling refined oil at 700# per sq. in. soft lead has been found suitable for rings 12.

A modification of my thrust washer for use on the impeller shaft of a centrifugal or other pump in which the shaft is likely to quiver, is shown in Fig. 2, which figure corresponds in general to Fig. 1, since like numerals refer to like parts. The modification shown in Fig. 2 is desirable since centrifugal pumps especially are likely to have quivering, vibrating or whipping shafts. The shoulder 6 is here provided with a spherical end 13, the center of the sphere lying in the center line of the plunger. The thrust washer ring 12' is formed to fit this shoulder. This allows the packing to oscillate within the packing space without causing leakage between the packing and the gland. For heavier duty, where the plunger is not likely to quiver, the flat end form shown in Figure 1 is simpler.

The use of a washer between the gland and the metallic packing is old in this art. The use of a soft metal in this washer in the manner defined above, to compensate for deformation of the gland, I believe to be novel and I do not limit myself to the particular means or material described to attain my object except as defined in the following claims.

I claim as my invention:

1. In combination with a pump stuffing-box having an impelling rod passing therethrough, a rigid metallic packing sleeve closely surrounding said rod and free to move laterally within said box and a gland closing the outer end of said box, the outer end of said packing sleeve and the inner end of said gland being faced smooth; a thrust washer interposed between said faced ends, said thrust washer comprising: a rigid core of hard metal, said core being free to move laterally within said box and having a radial thickness not substantially less than that of said packing sleeve, and an annular insert of soft metal on each face of said washer, said inserts being adapted to bear against said faced ends and having each a superficial area approximating the end area of said packing sleeve.

2. In combination with a pump stuffing box having an impelling rod passing therethrough, a rigid metallic packing sleeve closely surrounding said rod and free to move laterally within said box and a gland closing the outer end of said box, the outer end of said packing sleeve being faced square and smooth and the inner end of said gland being faced smooth in arcuate curvature; a thrust washer interposed between said faced ends, said thrust washer comprising: a rigid core of hard metal, said core being free to move laterally within said box and having a radial thickness not substantially less than that of said packing sleeve, and an insert of soft metal on each face of said washer, said inserts being adapted to bear against said faced ends and having each a superficial area approximating the end area of said packing sleeve, the insert bearing against said end of said packing sleeve having a flat face and the insert bearing against said end of said gland having an arcuate face.

In witness that I claim the foregoing I have hereunto subscribed my name this 5th day of January, 1928.

WILLIAM J. MacARTHUR.